Jan. 26, 1960  B. J. NORRIS ET AL  2,922,945
TRANSISTORIZED VOLTAGE REGULATORS
Filed March 30, 1956

INVENTORS.
BEVITT J. NORRIS
BY FRANK R. NOLL

*George R. Lust*
ATTORNEY

2,922,945

TRANSISTORIZED VOLTAGE REGULATORS

Bevitt J. Norris and Frank R. Noll, Fort Wayne, Ind., assignors to International Telephone and Telegraph Corporation Application March 30, 1956, Serial No. 575,184

12 Claims. (Cl. 323—22)

This invention relates to voltage regulators and is particularly directed to circuits for holding constant the voltage across a variable load supplied by power from an unregulated primary power source.

In electronic circuits where transistors comprise the amplifier components, it is often necessary to regulate the power supply within narrow limits. For structural and electrical compatibility, transistors should be used for the regulating functions. Unfortunately, transistors have short thermal time constants and are easily damaged by overload currents. If the currents through the transistor exceed rated values, as by an accidental short circuit, the transistor instantaneously "burns up." The responses of ordinary fuses and circuit breakers are much too slow to protect the transistors.

The object of this invention is to provide an improved voltage regulator in which voltage regulation is effected by transistors and in which a novel positive feedback circuit is employed to sense overload conditions and "open" the regulating transistors. The regulator of this invention further provides novel means for automatically restarting the regulator after the overload condition has been removed.

The objects of this invention are attained in a voltage regulator having a transistor with the emitter-collector circuit serially connected between the unregulated input and regulated output, characterized in that a negative feedback circuit is coupled from said output to the base of said transistor for regulating the current to the load, and a positive feedback circuit coupled from said output to said base to block said transistor when the voltage at the output drops excessively because of an overload, and means for applying an unblocking surge of potential to said transistor when the primary power source is switched on.

Figure 1:
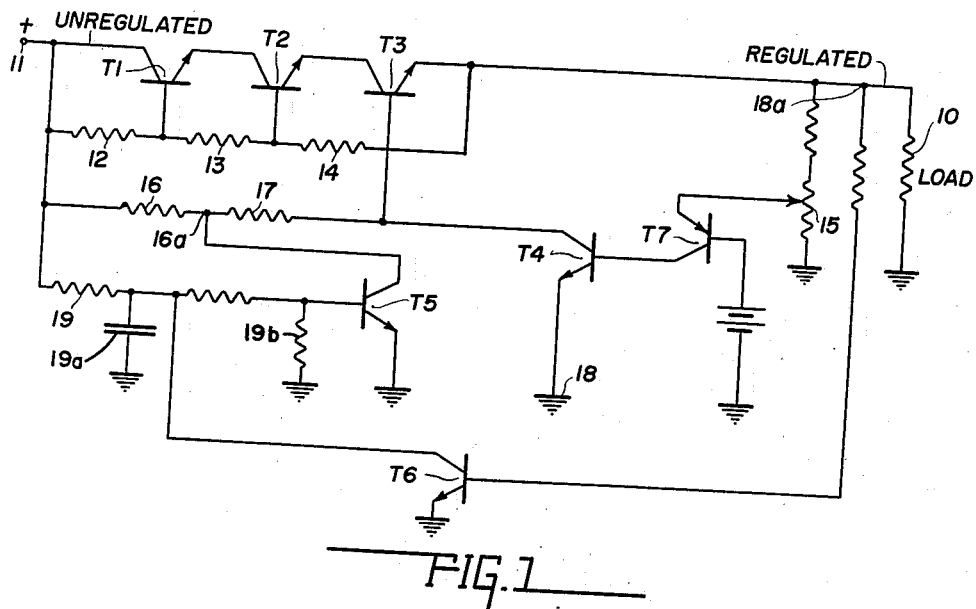
Figure 2:
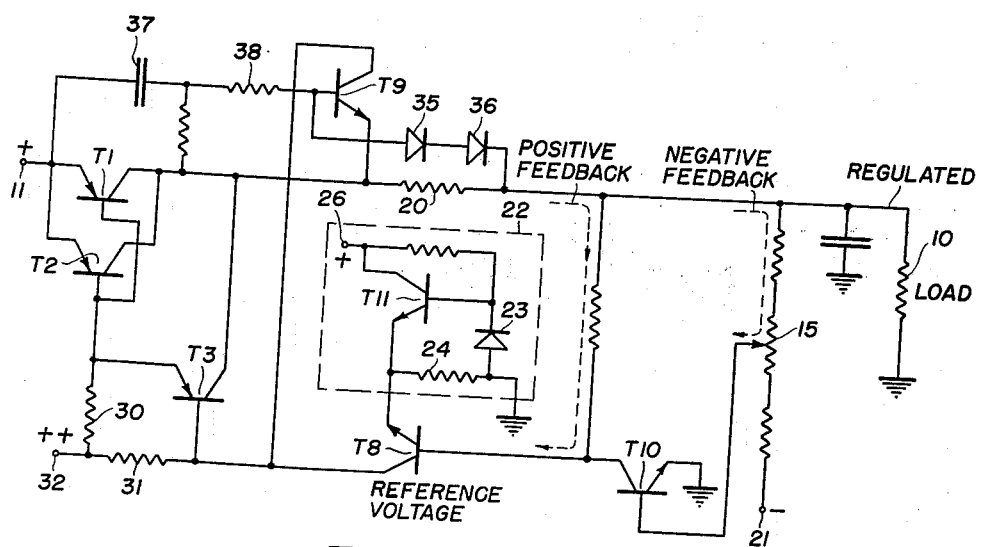

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a circuit diagram of a voltage regulator embodying this invention; and Fig. 2 is a circuit diagram of a voltage regulator similar to the regulator of Fig. 1 but including a restarting circuit.

In Fig. 1 the load 10 diagrammatically represented as resistive is coupled to the unregulated primary voltage source 11 through serially connected transistors T1, T2 and T3. One side of the power circuit is assumed to be grounded. The transistors contemplated are of the three element type including a base, the voltage of which or current through which controls relatively larger currents in the collector and emitter circuits. The emitter-collector circuits of transistors T1, T2 and T3 are serially connected in the power circuit. A potentiometer including resistors 12, 13 and 14 connected across the transistors is tapped to bias the bases of transistors T1 and T2. The base of transistor T3, however, is supplied with a feedback voltage from the load with the polarity of the feedback negative so that the current through transistor T3 will increase to accommodate increased demands at the load or reduced terminal voltage at the source. This negative feedback circuit comprises the potentiometer 15 in shunt to the load with a variable tap to the emitter of transistor T7, the collector of which is cascaded with the base of transistor T4, the emitter-collector circuit of which is in turn serially connected through resistors 16 and 17 between the source and ground 18. Hence, the base current of transistor T3 is controlled by transistors T4 and T7, the feedback being of the proper negative phase to compensate for load changes.

According to an important feature of this invention a positive feedback circuit is superimposed upon the negative regulating feedback loop. Transistors T5 and T6 are coupled between the point 16a of the voltage divider 16 and 17 to the point 18a at the load. The voltage at the load is sampled and if the voltage drops excessively in response to an overload, previously conducting transistor T6 is cut off, whereupon the current through resistor 19 decreases, permitting the voltage on the base of transistor T5 to rise. Transistor T5 thereupon conducts appreciably more heavily, thus causing point 16a to drop in voltage. This results in the voltage on the base of T3 sharply dropping and effectively open circuiting the power circuit through T3. The positive feedback just described is instantaneous and a sudden short circuit at the load 10 immediately cuts off or opens circuits T3 and protects the transistors T1, T2 and T3. After the overload has been removed, the output voltage is restored by switching the input voltage "off" and then "on." Without so removing the input voltage, the transistors T5 and T6 maintain the transistor T3 cut off. At the instant the input voltage is switched "off," the capacitor 19a is fully charged, but immediate discharge occurs through the shunt connected resistor 19b. At the next instant when the input voltage is switched "on," transistor chain T1, T2 and T3 starts to conduct and simultaneously therewith, capacitor 19a starts to charge. This capacitor charging current momentarily disables T5 preventing it from cutting off T3 while simultaneously the regulating circuit of T4 and T7 functions to increase the T3 base current thereupon increasing the conductivity of T3. The entire circuit now rapidly builds up to its regulated output voltage. Without the presence of the capacitor 19a or an equivalent circuit, switching the input voltage "on" would result in the "cut-off" circuit of T5 immediately restoring the cut-off voltage to the T3 base. Thus by momentarily disabling the circuit of T5 until the regulating circuit of T4 and T7 has an opportunity to restore the full value of output voltage, the transistor T3 is rendered fully conductive.

In Fig. 2, transistors T1 and T2 are connected in parallel between the load 10 and the source 11 to increase the current carrying capacity of the regulator. In this embodiment, the transistor T3 is connected across the collector of T1 and the base of T2 as shown. In addition, the dropping resistor 20 is serially connected between the transistors and load. The negative feedback loop includes the sampling potentiometer 15 connected across the load and high negative potential terminal 21. When the potential of sliding contact on potentiometer 15 is suddenly depressed by an overload, transistor T10 is blocked and transistor T8 is opened. That is, transistor T10 provides the proper negative feedback to the T8 base while the emitter of T8 is held at the reference voltage established by regulated voltage source 22 containing the emitter-follower transistor T11, with feedback through diode 23, and resistor 24, connected as shown to the unregulated voltage terminal 26. Resistors 30 and 31 provide paths for leakage currents in T1, T2 and T3 to the voltage source 32, at a voltage higher than source 11. Overload protection is provided by T8 since if the output voltage drops below the reference voltage at 22, transistor T8 will cut off, limiting the output current of transistors T1 and T2 to the mentioned leakage currents.

Since the circuit thus described is not self-starting, transistor T9 has been added to provide positive starting. The base-emitter of T9 is in series with diodes 35 and 36 across dropping resistor 20 and tells the transistor T9 when the overload has been removed at 10. Condenser 37 and resistor 38 provide a differentiating path for a positive surge of unregulated positive voltage to the base of T9. This causes T9 to conduct if the drop across resistor 20 is not too high, and this current is amplified by T1, T2 and T3, bringing the circuit into its regulating range. If the output load is not excessive, the diodes 35 and 36 will not conduct during this initial surge. However, if the load is excessive, the drop across resistor 20 will cause the diodes to conduct, limiting the current through transistor T9. The value of resistor 20 is chosen to limit the turn-on surge to a current well within the capacity of the transistors T1, T2 and T3. Thus if an overload exists the circuit cannot be turned on and the series transistors are at all times protected.

While we have described above the principles of our invention in connection with specific apparatus, it is to be clearly understood that this description is made only by way of example and not as a limitation to the scope of our invention.

What is claimed is:

1. A regulator comprising a first transistor connected between a voltage source and a load and having a base for controlling the current flow to the load, a biasing circuit for said base, a negative feedback circuit connected between the load and said biasing circuit for neutralizing voltage changes at the load; a positive feedback circuit including a second transistor connected across said first transistor, said second transistor having a base, and means for driving the base of the second transistor to conduction to open the first transistor in response to a drop in load voltage below a predetermined value.

2. In combination in a voltage regulator, an unregulated power source, a load, a first transistor serially connected between said source and load; a positive feedback circuit including a second transistor regeneratively coupled to said first transistor to hold said first transistor either on or off, said second transistor being responsive to a voltage sampled at said load; and a self-starting circuit comprising a series dropping resistor serially connected between said first transistor and said load; a third transistor with a base-emitter connected across said resistor, a diode in said base-emitter circuit, a capacitive coupling to the base from said source to supply a surge voltage to said first transistor to shift the first transistor to operating potential when the drop across said resistor is at a predetermined minimum level.

3. A voltage regulator comprising input and output circuits, a transistor having emitter, collector and base electrodes, the emitter and collector electrodes serially connected between said input and output circuits, a negative feedback circuit coupled from said output circuit to said base for regulating the current between the emitter and collector, and a positive feedback circuit coupled from said output circuit to said base to cut off said transistor when the voltage at the output circuit drops below a predetermined low level; said positive feedback circuit comprising means coupled to said base electrode responsive to the predetermined low level voltage for producing a signal which cuts off said transistor.

4. A voltage regulator comprising input and output circuits, a transistor having emitter, collector and base electrodes, the emitter and collector electrodes serially connected between said input and output circuits, a negative feedback circuit coupled from said output circuit to said base for regulating the current between the emitter and collector, and a positive feedback circuit coupled from said output circuit to said base to cut off said transistor when the voltage at the output circuit drops below a predetermined low level; said positive feedback circuit comprising an amplifier having an output circuit coupled to said base electrode, said amplifier being responsive to the predetermined low level voltage to produce a signal in said amplifier output circuit which cuts off said transistor.

5. A voltage regulator comprising input and output circuits, a transistor having emitter, collector and base electrodes, the emitter and collector electrodes serially connected between said input and output circuits, a negative feedback circuit coupled from said output circuit to said base for regulating the current between the emitter and collector, and a positive feedback circuit coupled from said output circuit to said base to cut off said transistor when the voltage at the output circuit drops below a predetermined low level; said positive feedback circuit comprising an amplifier which includes a second transistor having emitter, collector and base electrodes, the second transistor base being conductively connected to said output circuit, said amplifier having an output circuit which includes said second transistor emitter and collector electrodes, said amplifier output circuit being conductively coupled to the base of the first-mentioned transistor, said amplifier being responsive to a predetermined low level voltage in the first-mentioned output circuit to produce a signal which cuts off said first transistor.

6. A voltage regulator comprising input and output circuits, a transistor having emitter, collector and base electrodes, the emitter and collector electrodes serially connected between said input and output circuits, a negative feedback circuit coupled from said output circuit to said base for regulating the current between the emitter and collector, and a positive feedback circuit coupled from said output circuit to said base to cut off said transistor when the voltage at the output circuit drops below a predetermined low level; said positive feedback circuit comprising an amplifier which includes a second transistor having emitter, collector and base electrodes, the second transistor base being conductively connected to said output circuit, said amplifier having an output circuit which includes said second transistor emitter and collector electrodes, said amplifier output circuit being conductively coupled to the base of the first-mentioned transistor, said amplifier being responsive to a predetermined low level voltage in the first-mentioned output circuit to produce a signal which cuts off said first transistor; and starting circuit means operatively coupled from the first-mentioned input circuit to one of the first transistor electrodes for rendering said first transistor conductive when a voltage is applied to said first-mentioned input circuit.

7. A voltage regulator comprising input and output circuits, a first transistor having base, emitter and collector electrodes, the emitter-collector being serially connected between said input and output circuits; a positive feedback circuit including a second transistor having base, emitter and collector electrodes, a fixed source of voltage coupled to the second transistor emitter, a conductive connection between said output circuit and said second transistor base, circuit means connecting the second transistor collector to the first transistor base, said second transistor being responsive to a predetermined low level voltage in said output circuit to bias said first transistor to cut-off; and a self-starting circuit comprising a resistor serially connected between said first transistor emitter-collector and said output circuit a third transistor having base, emitter and collector electrodes, the third transistor base-emitter being connected across said resistor, a diode in series with said third transistor base-emitter, and a capacitor coupled between said input circuit and the base of said third transistor, said capacitor providing a source of voltage for raising the voltage on said first transistor to operating level in response to a predetermined voltage drop across said resistor.

8. A voltage regulator comprising input and output circuits, a first transistor having base, emitter and collector electrodes, the emitter-collector being serially connected between said input and output circuits; a positive feedback circuit including a second transistor having base, emitter and collector electrodes, a fixed source of voltage coupled to the second transistor emitter, a conductive connection between said output circuit and said second transistor base, a third transistor having base, emitter and collector electrodes, a first resistance connected between said third transistor emitter and base, said third transistor emitter being connected to the first transistor base, the third transistor base being connected to the second transistor collector, said third transistor collector being connected to said first transistor collector, said second and third transistors providing a cut-off voltage for the first transistor in response to a predetermined low level voltage in said output circuit.

9. A voltage regulator comprising input and output circuits, a first transistor having base, emitter and collector electrodes, the emitter-collector being serially connected between said input and output circuits; a positive feedback circuit including a second transistor having base, emitter and collector electrodes, a fixed source of voltage coupled to the second transistor emitter, a conductive connection between said output circuit and said second transistor base, a third transistor having base, emitter and collector electrodes, a first resistance connected between said third transistor emitter and base, said third transistor emitter being connected to the first transistor base, the third transistor base being connected to the second transistor collector, said third transistor collector being connected to said first transistor collector, said second and third transistors providing a cut-off voltage for the first transistor in response to a predetermined low level voltage in said output circuit; and a starting circuit comprising a second resistor serially connected between said first transistor emitter-collector and said output circuit, a fourth transistor having base, emitter and collector electrodes, the fourth transistor base-emitter being connected across said second resistor, a diode in series with said fourth transistor base-emitter, the fourth transistor collector being connected to the second transistor collector, and a capacitor coupled between said input circuit and said fourth transistor base, said capacitor providing a surge of voltage for raising the voltage on said first transistor to operating level in response to a predetermined voltage drop across said second resistor.

10. A voltage regulator comprising input and output circuits, a transistor having emitter, collector and base electrodes, the emitter and collector electrodes serially connected between said input and output circuits, a biasing circuit for the base electrode of said transistor, a negative feedback circuit coupled from said output circuit to said base for regulating the current between the emitter and collector, and a positive feedback circuit coupled from said output circuit to said base to cut off said transistor when the voltage at the output circuit drops below a predetermined low level; said positive feedback circuit comprising means coupled to said base electrode responsive to the predetermined low level voltage for producing a signal which cuts off said transistor, said means including a second transistor having collector and emitter electrodes coupled in shunt to said biasing circuit.

11. A voltage regulator comprising input and output circuits, a transistor having emitter, collector and base electrodes, the emitter and collector electrodes serially connected between said input and output circuits, a negative feedback circuit coupled from said output circuit to said base for regulating the current between the emitter and collector, and a positive feedback circuit coupled from said output circuit to said base to cut off said transistor when the voltage at the output circuit drops below a predetermined low level, said positive feedback circuit comprising means coupled to said base electrode responsive to the predetermined low level voltage for producing a signal which cuts off said transistor, said means comprising an amplifier which includes second and third transistors each having emitter, base and collector electrodes, a connection between the output circuit and the base of the second transistor, a connection between the second transistor collector and the third transistor base, and a connection between the second transistor collector and the first transistor base, said amplifier producing a signal in response to a predetermined low level voltage in said output circuit which cuts off said first transistor.

12. A voltage regulator comprising input and output circuits, a transistor having emitter, collector and base electrodes, the emitter and collector electrodes serially connected between said input and output circuits, a negative feedback circuit coupled from said output circuit to said base for regulating the current between the emitter and collector, and a positive feedback circuit coupled from said output circuit to said base to cut off said transistor when the voltage at the output circuit drops below a predetermined low level; said positive feedback circuit comprising means coupled to said base electrode responsive to the predetermined low level voltage for producing a signal which cuts off said transistor, said means comprising an amplifier which includes second and third transistors each having emitter, base and collector electrodes, a connection between the output circuit and the base of the second transistor, a connection between the second transistor collector and the third transistor base, a connection between the second transistor collector and the first transistor base, said amplifier producing a signal in response to a predetermined low level voltage in said output circuit which cuts off said first transistor, the second and third transistor emitters being grounded, a capacitor connected between the third transistor base and ground, and circuit means for applying a starting potential across said capacitor.

References Cited in the file of this patent

UNITED STATES PATENTS

| | | |
|---|---|---|
| 2,484,724 | Paradise et al. | Oct. 11, 1949 |
| 2,698,416 | Sherr | Dec. 28, 1954 |
| 2,745,009 | Moulon | May 8, 1956 |
| 2,751,549 | Chase | June 19, 1956 |
| 2,759,142 | Hamilton | Aug. 14, 1956 |